United States Patent [19]

Vogt et al.

[11] Patent Number: 4,488,639

[45] Date of Patent: Dec. 18, 1984

[54] ROLLER CONVEYOR WITH FRICTION ROLL DEVICE

[75] Inventors: Robert K. Vogt; Martin A. Heit, both of Cincinnati, Ohio

[73] Assignee: E. W. Buschman Company, Cincinnati, Ohio

[21] Appl. No.: 526,507

[22] Filed: Aug. 25, 1983

Related U.S. Application Data

[63] Continuation of Ser. No. 299,693, Sep. 8, 1981, abandoned, which is a continuation of Ser. No. 914,060, Jun. 9, 1978, abandoned.

[51] Int. Cl.³ .............................................. B65G 13/08
[52] U.S. Cl. ..................................... 198/787; 198/781; 198/789; 474/140
[58] Field of Search ............... 198/781, 787, 789, 790, 198/791, 831, 841; 474/111, 139, 140, 144

[56] References Cited

U.S. PATENT DOCUMENTS

| 2,836,284 | 5/1958 | Gilliat | 198/790 X |
| 3,425,341 | 2/1969 | McGinley | 198/791 |
| 3,718,248 | 2/1973 | Muller | 198/781 |
| 3,900,097 | 8/1975 | De Courcy | 198/781 |
| 3,916,797 | 11/1975 | Block et al. | 198/779 X |
| 3,923,150 | 12/1975 | Jager | 198/787 X |
| 4,108,303 | 8/1978 | Vogt et al. | 198/781 |
| 4,109,783 | 8/1978 | Vogt | 198/781 |
| 4,121,709 | 10/1978 | Gebhart | 198/781 |
| 4,172,519 | 10/1979 | Leach | 198/781 |

FOREIGN PATENT DOCUMENTS

| 55-31723 | 3/1980 | Japan | 198/789 |
| 7803859 | 11/1978 | Netherlands | 198/841 |
| 812439 | 4/1959 | United Kingdom | 198/831 |

Primary Examiner—Robert J. Spar
Assistant Examiner—Jonathan D. Holmes
Attorney, Agent, or Firm—Biebel, French & Nauman

[57] ABSTRACT

In a live roller conveyor wherein friction drive wheels underlie and drive the live rollers, sprockets mounted on the frame drive the friction drive wheels and are themselves driven by a driving chain course running below them. Both the driving and return courses of the chain are supported and guided by the same chain guide member of extruded plastic which is mounted on the frame and includes laterally projecting flanges having shoulder portions which directly support and guide the respective chain courses. The drive mechanism is provided with multiple sheet metal guard members which are mounted in alternately overlapping (shingle) fashion along the conveyor and are constructed with sections which are readily bendable to accommodate curved stretches of the conveyor. This drive mechanism and the guard members are equally useful on straight and curved conveyors and on combinations of straight and curved conveyor sections.

14 Claims, 16 Drawing Figures

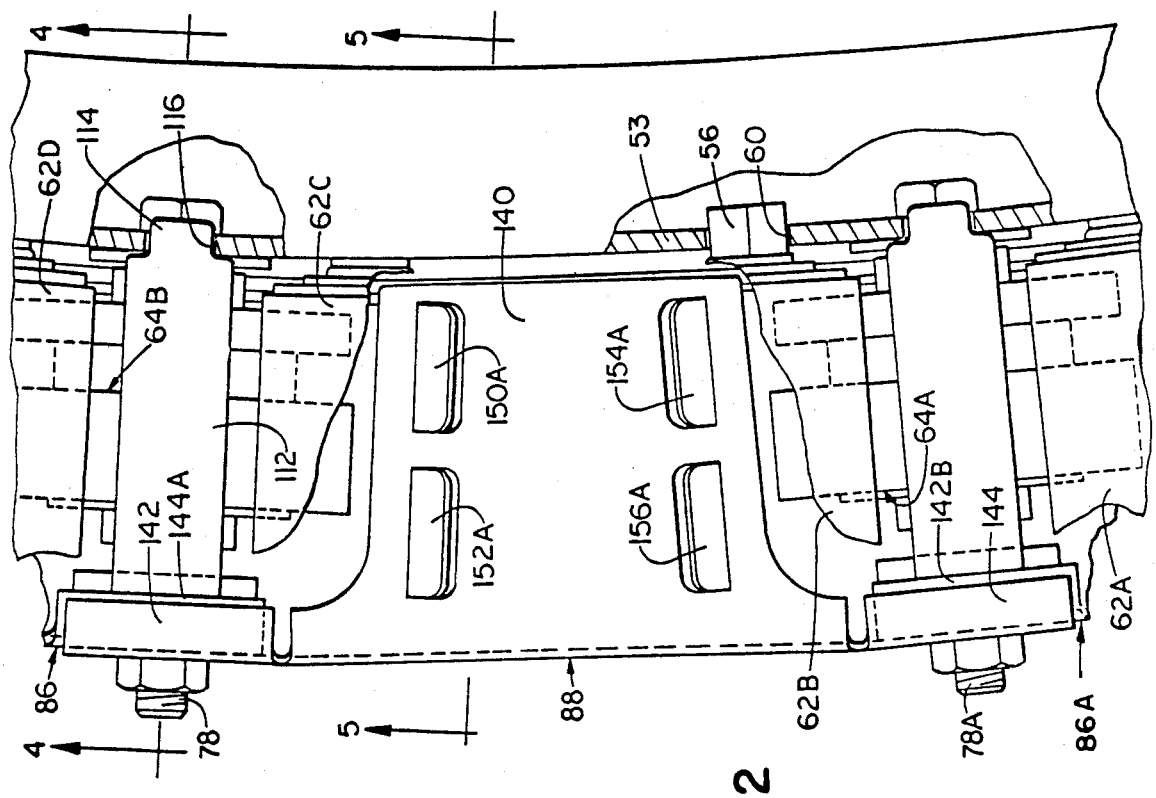
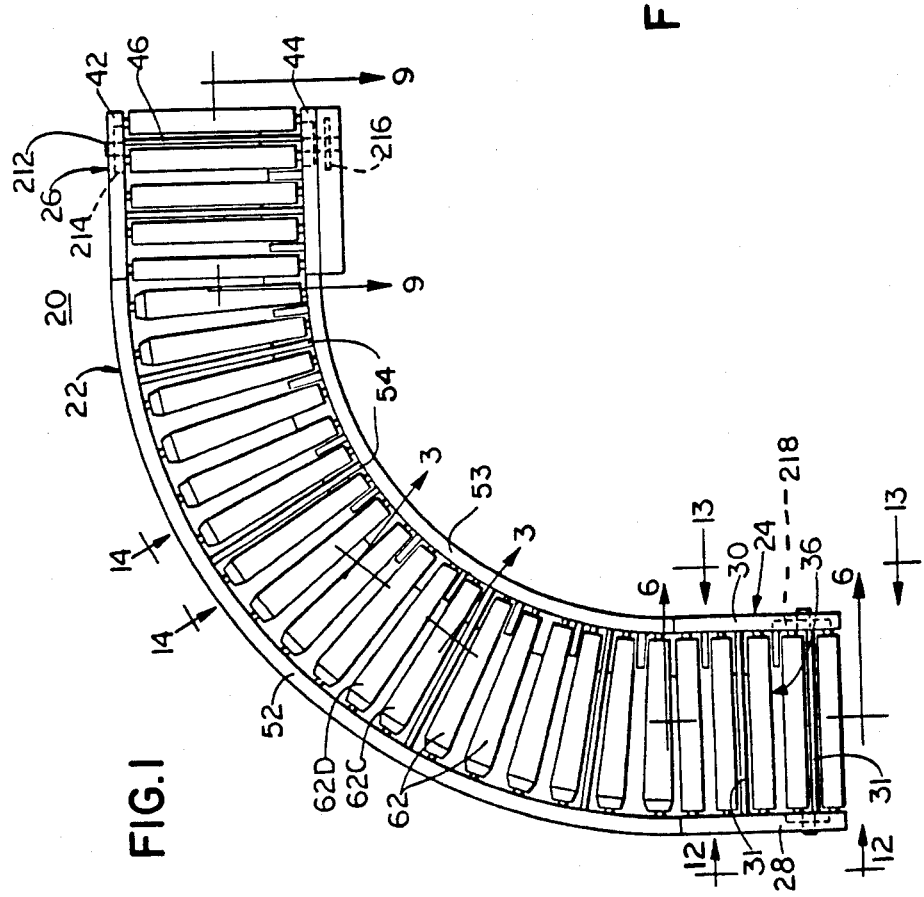
FIG.1
FIG.2

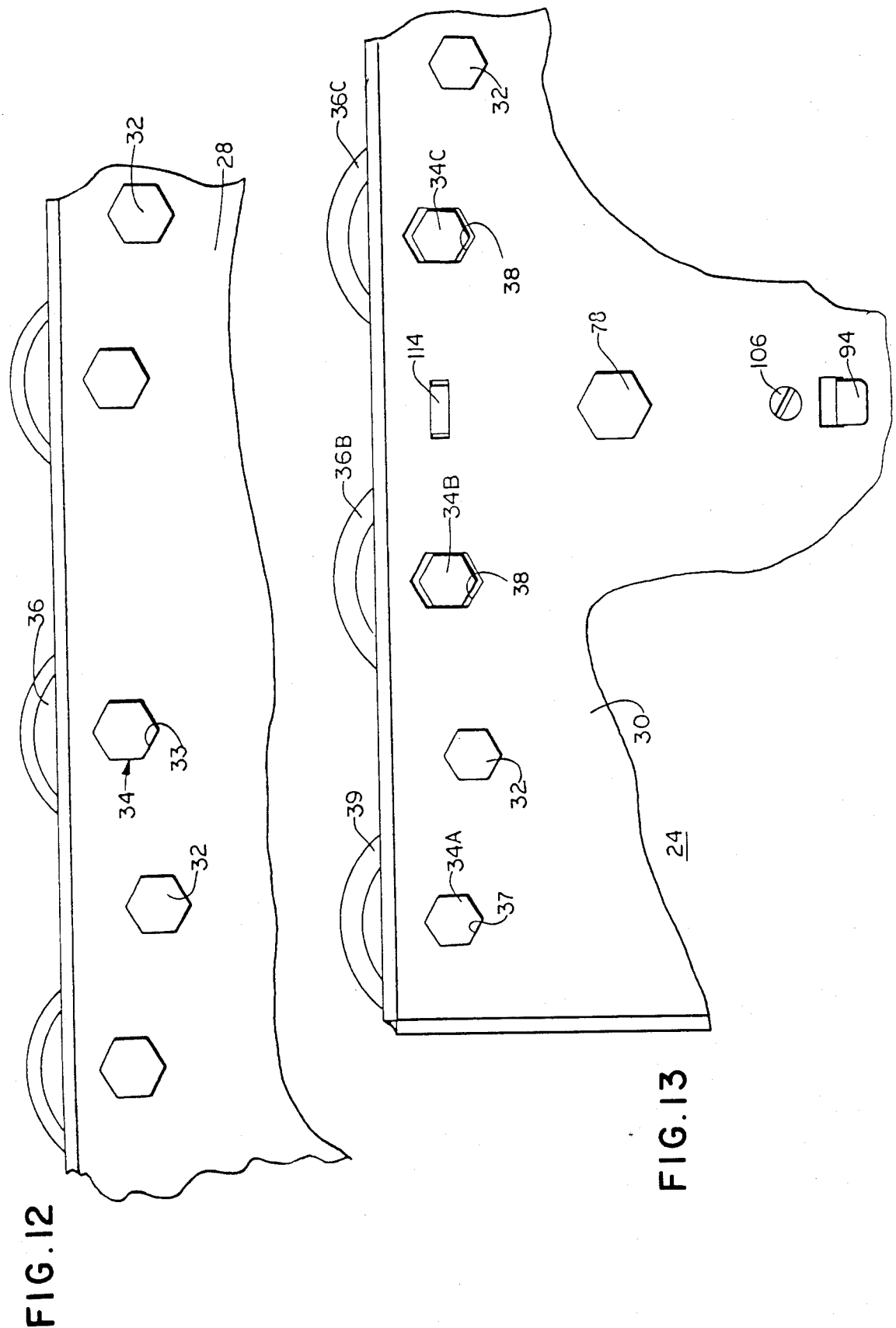

ROLLER CONVEYOR WITH FRICTION ROLL DEVICE

RELATED APPLICATIONS

This application is a continuation of application Ser. No. 299,693 filed Sept. 8, 1981, now abandoned, which was a continuation of application Ser. No. 914,060 filed June 9, 1978 now abandoned.

BACKGROUND OF THE INVENTION

This invention relates to a conveyor having powered or live rollers, and more particularly to a chain drive for a live roller conveyor which is equally useful on straight conveyors and on curved conveyors of the type wherein selected conveyor rollers are driven by friction drive wheels mounted on the conveyor frame below the rollers. In such curved conveyors, it is desirable to use drive chains which are sufficiently flexible to be guided to follow the curvature of the conveyor frame without developing undesirable strains, and this in turn can lead to a tendency of the chain to wander laterally from properly meshing relation with the sprockets through which its driving force is transmitted to the drive wheels for the rollers.

SUMMARY OF THE INVENTION

The principle object of the present invention is to provide a chain drive mechanism for a live roller conveyor which is equally useful on both straight and curved conveyors, and which is characterized by a chain guide member of unique construction for guiding and supporting both the driving and return courses of the chain against all of the forces that tend to cause the chain to wander off course in use, including along both straight and curved sections of the conveyor.

The chain guide member of the invention is preferably a plastic extrusion of substantially the same length as the conveyor frame, but of course can comprise a plurality of pieces arranged end-to-end, and of sufficient flexibility to assume whatever curvature it may require to match the conveyor frame side rail on which it is mounted. This guide member includes a main body portion, which is mounted directly on one of the conveyor frame side rails, and laterally projecting upper and lower flanges on which the driving and return courses of the chain are trained. The upper flange projects between the two chain courses, and it includes an upwardly facing shoulder which supports the driving course in meshing engagement with the successive sprockets through which its driving force is transmitted to the friction drive wheels for the conveyor rollers.

The lower flange includes a similar upwardly facing shoulder which supports and guides the return chain course. In addition, the upper flange includes a downwardly facing shoulder proportioned to cooperate with the lower flange to restrain the return course of the chain against lateral movement away from the guide member. In addition, the body portion of the guide member includes surface areas on its side facing the drive chain which act as guide bearings for the chain if it should move toward the rail, on either curved or straight sections of the conveyor.

The invention provides the further advantage of assurance of maintained proper driving engagement between the driving course of the chain and the sprockets associated with each friction drive wheel by supporting the chain guide member in fixed braced relation with each sprocket. More specifically, the chain guide member is mounted on the conveyor frame side rail by means of a series of brackets, one of which is mounted immediately adjacent each of the power transmission devices by means of the same bolt on which the power transmission device itself is mounted on the side rail.

BRIEF DESCRIPTION OF THE DRAWINGS

FIG. 1 is a plan view of a conveyor constructed in accordance with an embodiment of this invention;

FIG. 2 is a fragmentary plan view on an enlarged scale of a portion of the conveyor illustrated in FIG. 1 looking in the direction of the arrows 2—2 in FIG. 3, parts being broken away to reveal details of construction;

FIG. 12 is an enlarged fragmentary view looking in the direction of the arrows 12—12 in FIG. 1;

FIG. 13 is an enlarged fragmentary view looking in the direction of the arrows 13—13 in FIG. 1;

DESCRIPTION OF THE PREFERRED EMBODIMENTS

Figure 3:
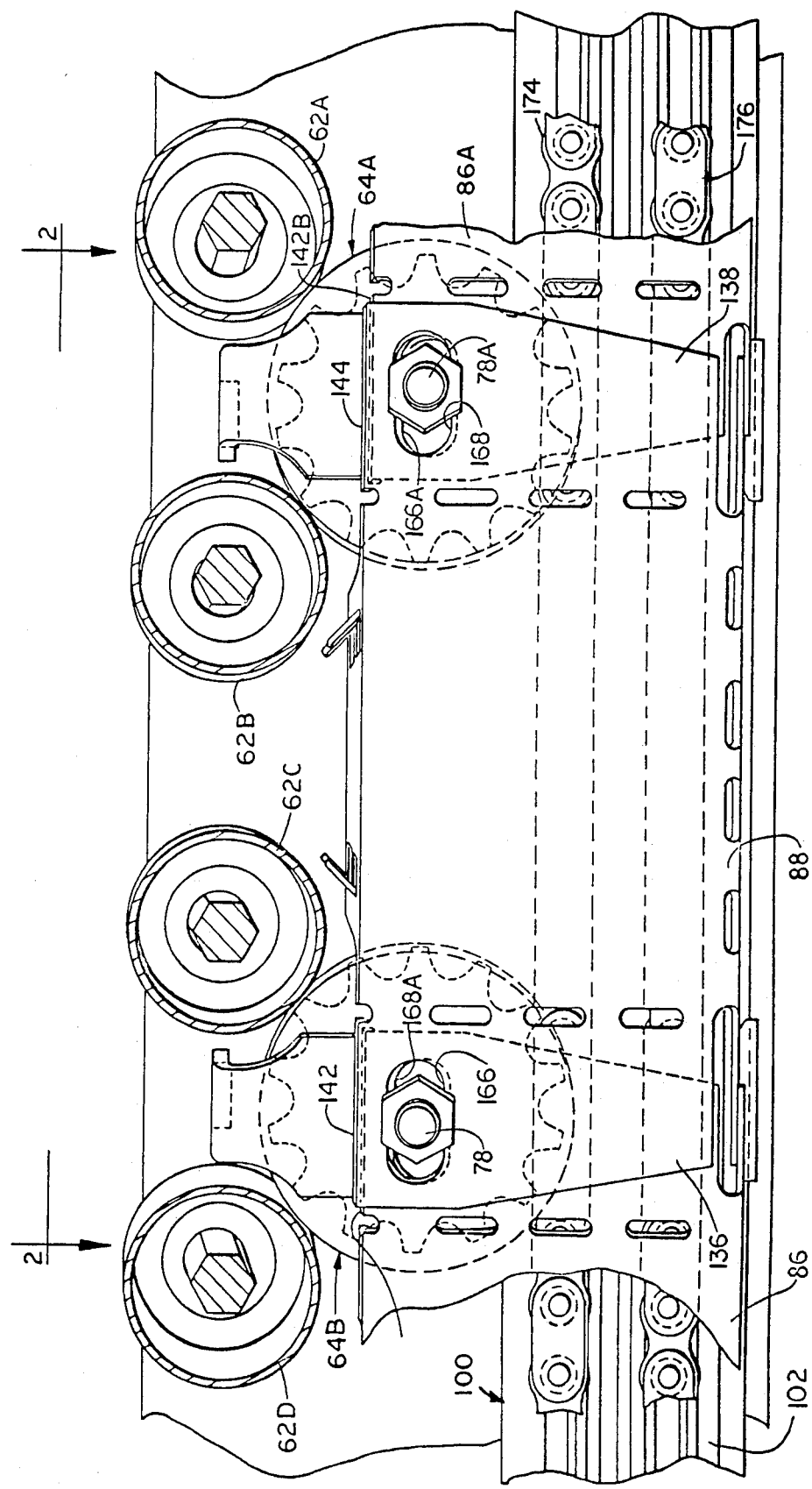
FIG. 3 is a section taken on an enlarged scale on the line 3—3 in FIG. 1.

The conveyor 20, in FIG. 1 includes a curved central section 22 and straight end sections 24 and 26. The straight section 24 includes parallel rails 28 and 30 held in spaced parallel relation by cross tubes 31, which are held in place by bolts 32 (FIGS. 12 and 13) extending through openings in the rails 28 and 30 and threaded in end portions of the cross tubes 31.

The rail 28 is provided with hexagonal openings 33 (FIG. 12) which receive and hold end portions of the axles 34 on which the cylindrical conveying rollers 36 are rotatably mounted. At the opposite side of the frame, the axles 34 are received in openings 37 and 38 in the rail 30 (FIG. 13). The opening 37 is of the same cross section as the axle 34A which is received therein so that an idler roller 39 rotatably mounted on the axle 34A has a stationary axis. Openings 38 are elongated vertically so that end portions of the axles 34B and 34C can float up and down therein. Live rollers 36B and 36C, which are rotatably mounted on the cross rods 34B and 34C respectively, rest on and are driven by a friction drive wheel 40A (FIG. 6), and live rollers 36D and 36E rest on a friction drive wheel 40B to be driven thereby.

Figure 9:
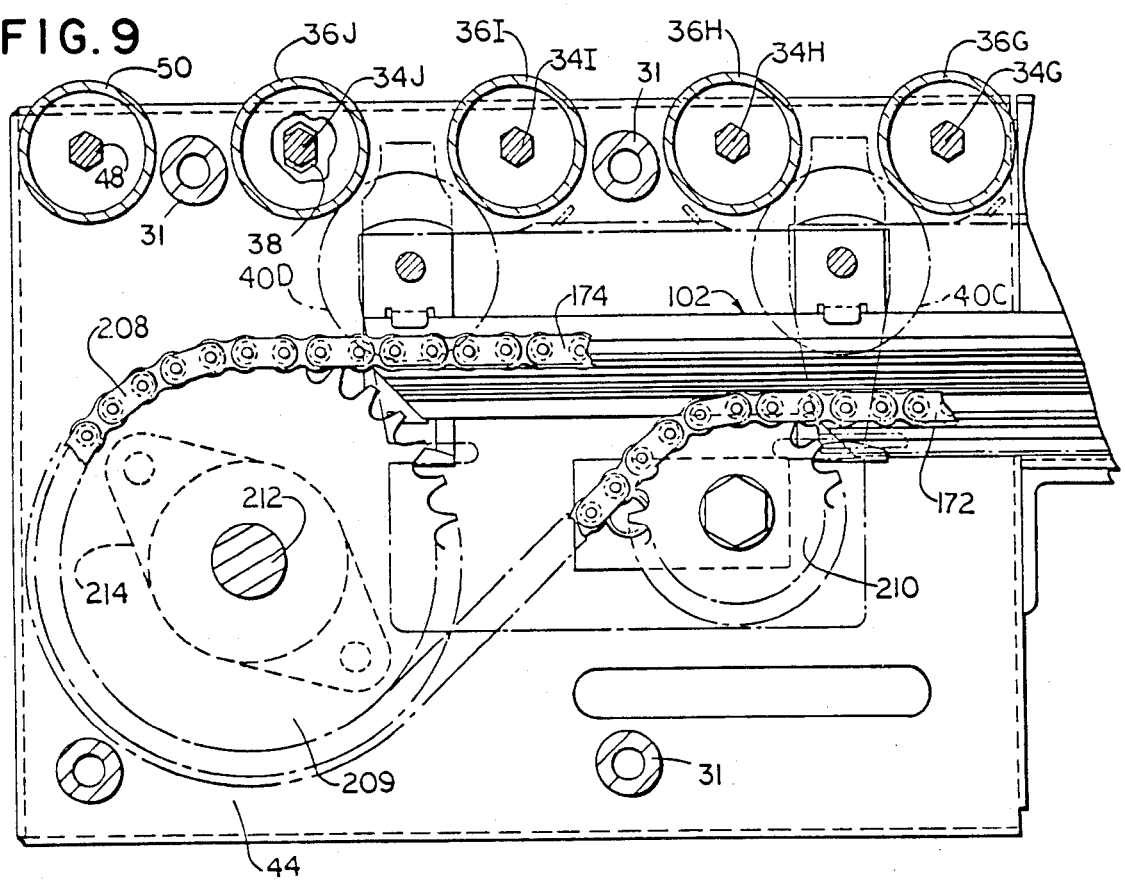
FIG. 9 is an enlarged section on the line 9—9 in FIG. 1, with the guards and drive wheels being shown in dot-dash lines.

In a similar fashion, the straight section 26 includes side rails 42 and 44, which are held in spaced relation by cross tubes 31. A stationary axle 48 rotatably supports an idler roller 50 (FIG. 9). Floating axles 34G, 34H, 34I and 34J rotatably support floating live rollers 36G, 36H, 36I and 36J, respectively. End portions of the axles 34G, 34H, 34I and 34J are received in vertically elongated openings in the rail 44, one of which is shown at 38 in FIG. 9. The live rollers 36G and 36H rest on and are driven by a friction drive wheel 40C, and the live rollers 36I and 36J rest on and are driven by a friction drive wheel 40D.

Figure 14:
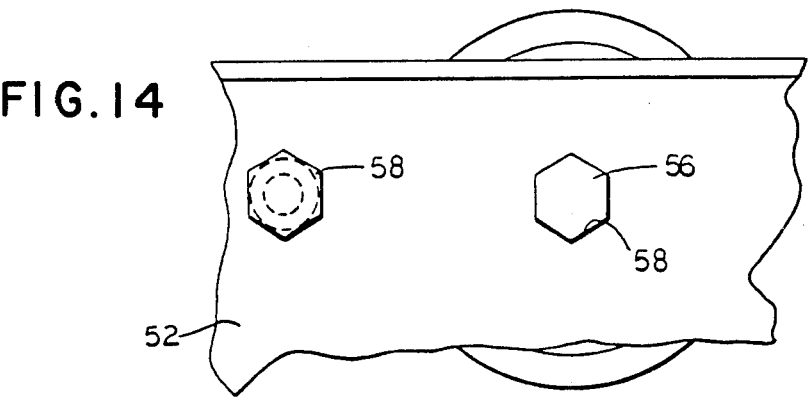
FIG. 14 is an enlarged fragmentary view looking in the direction of the arrows 14—14 in FIG. 1.

The curved conveyor section 22 includes an outer side rail 52 and an inner side rail 53, which are held in concentric radially spaced relation by cross tubes 54 and bolts 55 (FIG. 14) threaded in the ends of the cross tubes 54. Floating axles 56 (FIG. 14) have their outer ends received in openings 58 in the outer side rail 52. The inner end portions of the floating axles 56 (FIG. 2) are received in upwardly elongated openings 60 in the inner side rail 53. Live rollers 62 of frusto-conical shape as shown in FIG. 1 are rotatably mounted on the floating axles 56 with their upper surfaces substantially horizontal. Pairs of the live rollers 62 rest on friction drive wheels in the same manner that rollers 62A and 62B rest on the drive wheel 64A and live rollers 62C and 62D rest on the drive wheel 64B (FIGS. 2 and 3).

Figure 4:
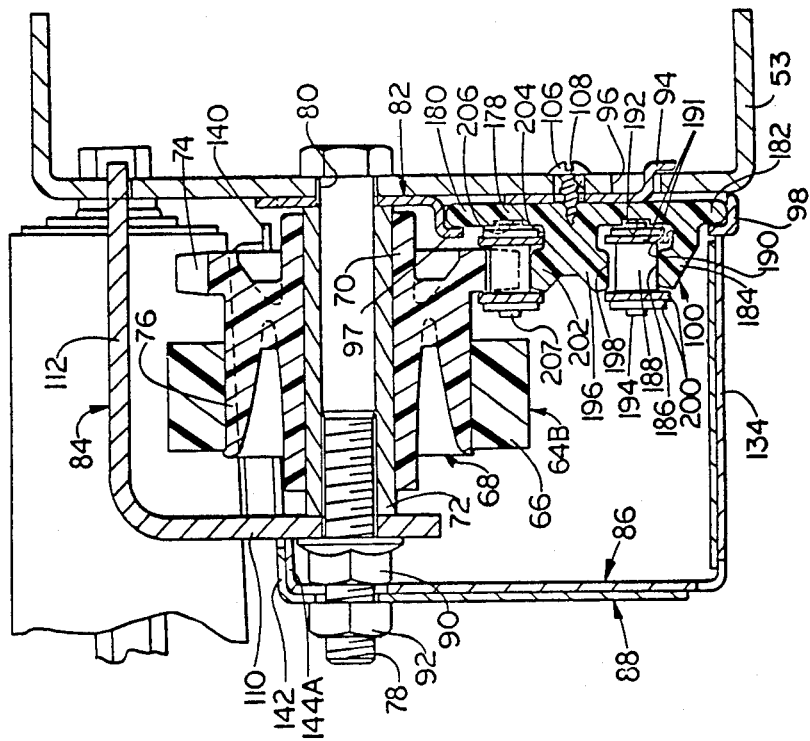
FIG. 4 is a section on the line 4—4 in FIG. 2.

Each of the friction drive wheels forms part of a power transmission assembly, and only the drive wheel 64B and the other parts its associated assembly will be described in detail. As shown in FIG. 4, the drive wheel 64B includes a friction ring 66 of resilient material mounted on a rigid plastic body 68 which includes a central tubular portion 70 rotatably mounted on a sleeve 72, a sprocket portion 74, and an annular skirt 76 which supports the friction ring 66.

The sleeve 72 is mounted on a bolt 78 which forms an axle therefor, the bolt 78 being cantilevered at its head end in an opening 80 in the inner side rail 53 and extends horizontally therefrom. Each bolt 78 assists in the suport of one of the chain guide carrier bracket 82, and also supports a finger guard 84 and a pair of guards 86 and 88, which are referred to as "shingle" guards because they are mounted in overlapping relation similarly to shingles. Nut 90 clamps the sleeve 72 between the finger guard 84 and the bracket 82 with respect to the rail 53 and the head of bolt 78 to complete the cantilever mounting of bolt 78. A second nut 92 holds the guards 86 and 88 in assembled relation on the inner end of the bolt 78.

Figure 8:
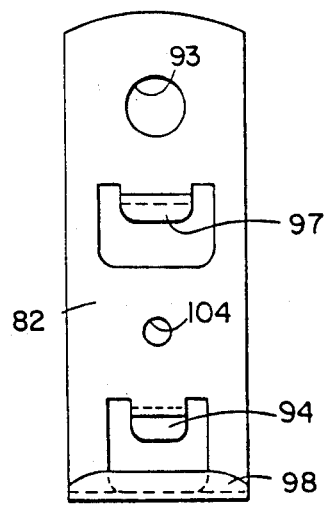
FIG. 8 is a view in side elevation of a bracket which is a part of the conveyor section.

The chain guide carrier bracket 82, as shown in FIGS. 4 and 8, is a sheet metal member provided with an opening 93 through which the bolt 78 extends. A first hook portion 94 of bracket 82 extends through an opening 96 in the inner side rail 53. Second and third hook portions 97 and 98 of the bracket 82 engage upper and lower edges, respectively, of the chain guide member 100. An opening 104 in the bracket 82 receives a screw 106, which extends through an opening 108 in the guide rail 53 and is threaded in the chain guide member 100 to anchor the chain guide member in place.

Figure 10:
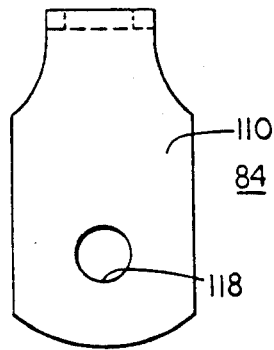
FIG. 10 is a view in side elevation of a finger guard for use in the conveyor.
Figure 11:
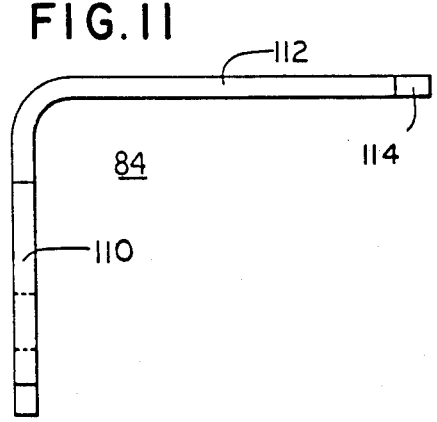
FIG. 11 is a view in end elevation of the finger guard shown in FIG. 10.

As shown in FIGS. 10 and 11, the finger guard 84 is of generally angle shape and includes a vertical arm 110 and a horizontal arm 112. The arm 112 overlies the drive wheel 64B between the live rollers 62C and 62D to prevent entry of a finger between the drive wheel 64B and the live rollers 62C and 62D. An end portion 114 of the arm 112 is received in an opening 116 in the inner side rail 53 and an opening 118 in the upright arm 110 receives the bolt 78.

Figure 15:
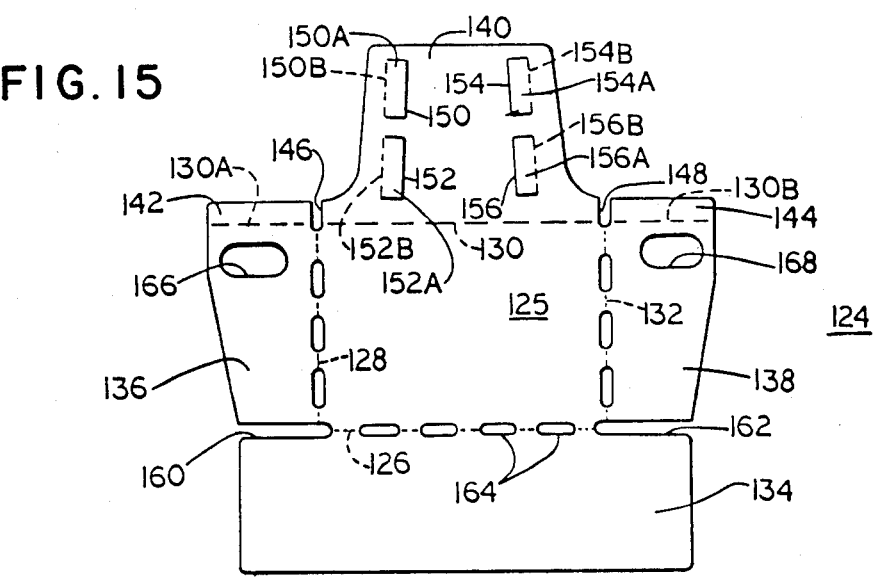
FIG. 15 is an elevation of the blank used to form one of the shingle guards used in the conveyor, with bend lines indicated by dash lines.

The shingle guards 86 and 88 are identical in construction, and each is formed from a blank 124 as shown in FIG. 15. The blank 124 includes a central section 125 bounded by fold lines 126, 128, 130 and 132. A lower flange section 134 is separated from the central section 125 by the fold line 126. Side mount flange sections 136 and 138 are separated from the central section 125 by the fold lines 128 and 132, respectively. An upper flange section 140 is separated from the central section 125 by the fold line 130, and extensions 130A and 130B of the fold line 130 separate tab portions 142 and 144 from the side mount flange sections 136 and 138, respectively.

Figure 5:
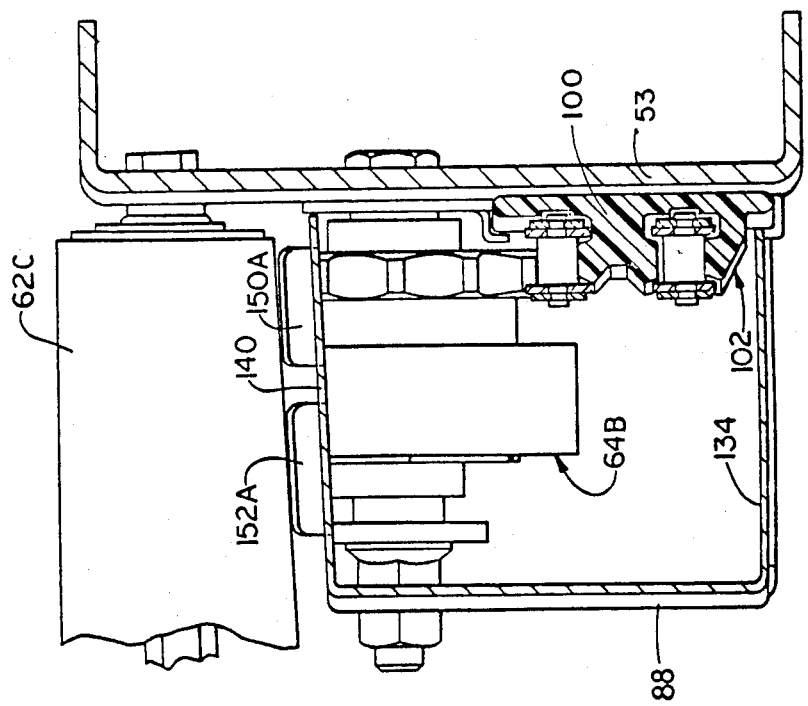
FIG. 5 is a section on the line 5—5 in FIG. 2.

Slots 146 and 148 in the upper edge of blank 124 separate the tabs 142 and 144, respectively, from the upper flange section 140. C-shaped cuts 150, 152, 154 and 156 are formed in the upper flange section 140 to define tabs 150A, 152A, 154A and 156A, which can be bent out of the plane of the upper flange section 140 along fold lines 150B, 152B, 154B and 156B, respectively, as shown in FIGS. 2 and 5, forming angled tabs. Slots 160 and 162 separate the side mount flange sections 136 and 138, respectively, from the lower flange section 134. Short slots 164 along the fold lines 126, 128, and 132 form weakening therealong to facilitate folding. Slots 166 and 168 are formed in the slide mount flange sections 136 and 138, respectively, for use in mounting.

The upper flange section 140 and the tabs 142 and 144 can be folded out of the plane of the central section 125, as the sections 142 and 140 are shown in FIGS. 4 and 5, so that when the guide is in position, the upper flange 140 is substantially parallel to lower faces of the rollers 62C and 62B. The lower flange section 134 can also be folded as shown in FIG. 5. The side mount flange sections 136 and 138 are folded sufficiently to bring them into perpendicularity with the axes of the bolt 78 and the bolt 78A of adjacent drive units.

The bolt 78 extends through the slot 166 in the side mount flange 136 of the shingle guard 88 and through a slot 168A in a side mount flange of the shingle guard 86. Similarly, the bolt 78A extends through the slot 168 of the side guard mount flange 138 of the shingle guard 88 and through a slot 166A in a side mount flange of a shingle guard 86A. Thus their guards are mounted in overlapping or shingle relation, with the slots 160 and 162 and adjacent guards interfitting, with the tabs 142 and 144 of the guard 88 resting on tabs 144A and 142B of the guards 86 and 86A, respectively, and with the guards alternating in upper and lower position.

The lower flange 134 of each side shingle guard extends toward a lower portion of the side rail 53 and terminates substantially at the chain guide member 100. The upper flange 140 extends close to the side rail 53 with the angled tabs 150A and 152A close to the live roller 62C and the angled tabs 154A and 156A close to the live roller 62B to prevent entry of a finger between the live rollers and the associated friction drive wheel.

Figure 6:
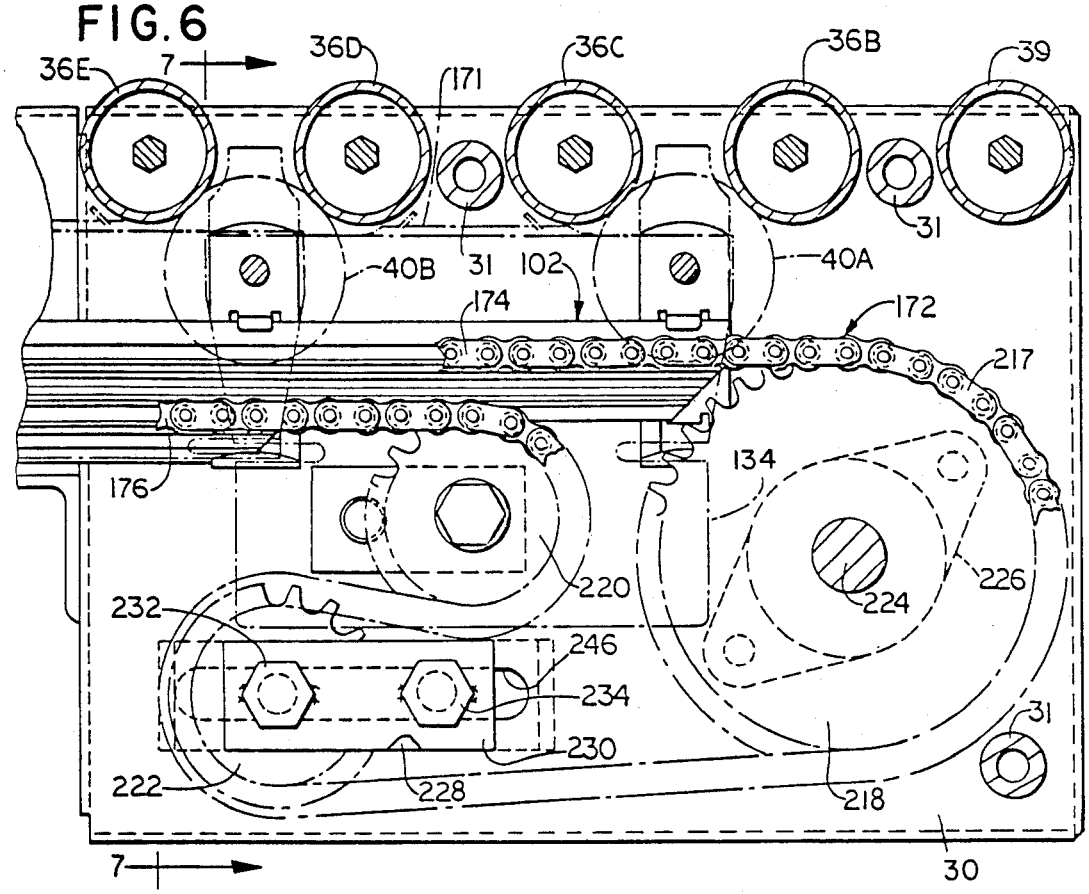
FIG. 6 is an enlarged section on the line 6—6 in FIG. 1, with the guards and friction drive wheels being shown in dot-dash lines.
Figure 7:
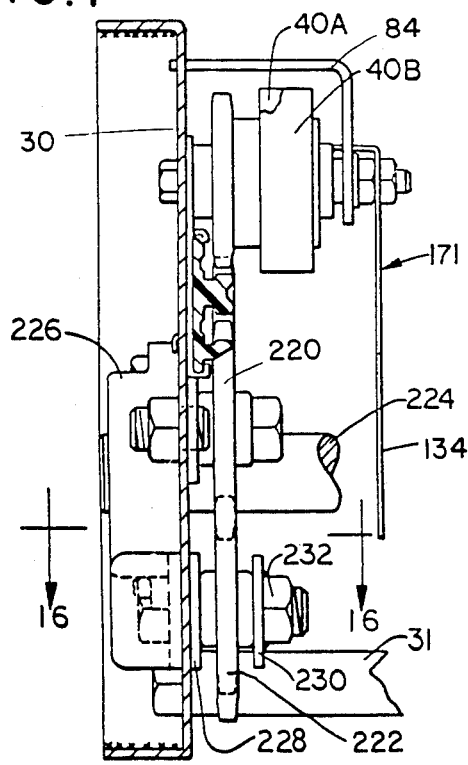
FIG. 7 is a somewhat schematic section on the line 7—7 in FIG. 6, with the drive chain being removed for clarity.

As shown in FIGS. 6, 7 and 9, a single guard member 171 is used in the straight sections 24 and 26, at each end of the conveyor. The guard member 171 is formed from one of the same blanks 124 as the guards 86 and 88, but the lower flange 134 thereof is not bent but extends downwardly.

The chain guide member 100 supports and guides a roller chain 172 having an upper course 174, which engages and drives the sprocket portions 74 of the friction drive wheels 64, and a lower course 176. The chain guide member 100 is an elongated plastic extrusion of sufficient flexibility to follow curves of the conveyor. As shown in FIG. 4, the chain guide member 100 includes a body 178 which terminates in upper and lower flanges 180 and 182 which are held by the hook portions 98 and 100 of the chain guide brackets 82.

A lower flange 184 of the chain guide member 100 carries an upwardly facing shoulder 186, which underlies and supports the rollers 188 of the lower course 176 of the roller chain 172. An upwardly opening slot 190 in the flange 184 receives the links 191 of the lower course on the right hand side of the chain as shown in FIG. 4. A groove 192 in the body 178 receives the ends of pin members 194 of the lower chain course 176.

An upper flange 196 of the chain guide member 100 includes a lower, downwardly facing shoulder 198, which fits between the right side links 191 and left side links 200 of the lower chain course 176 to prevent disengagement of the lower course 176 from the chain guide member 100. The upper flange 196 also includes an upwardly facing shoulder 202, which underlies and supports the rollers of the upper course 174 of the roller chain 172. An upwardly opening slot 204 in the upper flange 196 receives the right hand links of the upper course 174 of the roller chain 172. A groove 206 in the body 178 receives the ends of pin members 207 of the upper course 174 of the roller chain 172.

As shown in FIGS. 4-5, the surface areas of the body 178 of chain guide member 100 which extend above the flange 196 and between the flanges 196 and 184 laterally overlie the driving and return chain courses and insure against displacement of either chain course from its guiding shoulder to the right in FIG. 4, which would be toward the inside of the curved conveyor section 22 in FIG. 1. These surfaces can therefore act as lateral bearing and guide surfaces for the chain courses if the relative dimensions, tolerances and tensions involved are such that the chain contacts one or both thereof.

The chain guide member 100 extends the full length of the curved central section 22 of the conveyor, as shown in FIG. 3, and terminates below the last drive unit in each of the straight sections 24 and 26 (FIGS. 6 and 9). In addition to the other advantages pointed out above, the chain guide member 100 and its associated parts provide assured maintained meshing engagement of the driving chain course 176 with each of the sprockets 74. This is accomplished by the action of the brackets 82, each of which is held in fixed relation with the associated drive unit by the mounting of each bracket on the adjacent bolt 78 and the associated screw 106 which binds the guide member 100 to the rail 53 through each bracket 82.

The chain 172 can be what is known as a side bow or side flexing roller chain of sufficient flexibility to follow the chain guide member 102 along the curved center section 22. In the straight section 26 at the drive end of the conveyor, the chain 172 includes a portion 208 which extends between the upper and lower courses 174 and 172 and travels on a large sprocket 209 (FIG. 9) and an idler sprocket 210. The large sprocket 209 is carried by a shaft 212, which is rotatably mounted in bearings 214 and carries a drive sprocket 216 (FIG. 1), which can be driven by an appropriate power drive, not shown in detail.

In the straight section 24 at the other end of the conveyor, the roller chain 172 includes a portion 217 (FIG. 6) which connects the upper and lower courses 174 and 176 and travels over a large idler sprocket 218, a smaller idler sprocket 220, and an adjustable sprocket idler 222. The large sprocket 218 is mounted on a shaft 224, which is rotatably supported in a bearing 226 mounted on the side rail 30.

Figure 16:
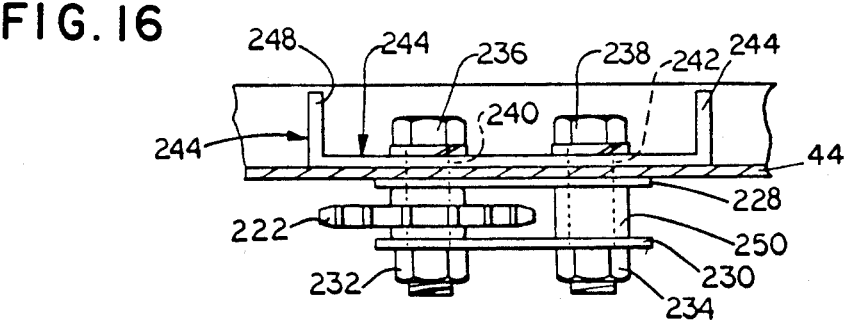
FIG. 16 is a fragmentary section on the line 16—16 in FIG. 7.

The adjustable sprocket 222 is rotatably mounted on rail 30 between mounting plates 228 and 230 (FIG. 6). Nuts 232 and 234 are welded on the plate 230 and receive bolts 236 and 238, which extend through clear holes 240 and 242, respectively, in a channel shaped bracket 244 (FIG. 16), through an elongated slot 246 in the rail 30, and through clear bores, not shown in detail, in the plates 228 and 230. The bolt 238 also extends through a spacer sleeve 250 between the mounting plates 228 and 230. When the bolts 236 and 238 are loosened, the adjustable sprocket 222 can be moved to provide proper tension in the roller chain 172, whereupon the bolts are tightened to maintain such proper tension. Flanges 248 of the bracket 244 serve as handles for moving the adjustable sprocket 222.

The conveyor is shown with a curved central section, but the drive can be used with a conveyor having a straight central section or with a central section having a compound curvature. The conveyor structure is subject to structural modification without departing from the spirit and scope of the appended claims.

What is claimed is:

1. A live roller conveyor, comprising
   (a) a frame,
   (b) a plurality of live rollers rotatably mounted on said frame,
   (c) a plurality of power drive wheels,
   (d) means for rotatably mounting each of said drive wheels on said frame underlying said live rollers with each of said drive wheels in driving engagement with at least one of said rollers,
   (e) a sprocket rotatably mounted on said frame in driving relation with each of said drive wheels,
   (f) a drive chain including a driving course for said sprockets running below said sprockets and a return course running below said driving course,
   (g) an elongated chain guide member mounted on said frame in laterally overlying relation with one side of said chain courses,
   (h) said guide member including a first flange projecting laterally therefrom between said chain courses and having thereon an upwardly facing elongated shoulder supporting said driving chain course in mesh with said sprockets,
   (i) said guide member also including a second flange projecting laterally therefrom into underlying relation with said return chain course and including an upwardly facing elongated shoulder supporting and guiding said return chain course, and
   (j) means for driving said chain to drive said wheels and said live rollers.

2. A conveyor as defined in claim 1 further comprising means rigidly securing said guide member to said frame in fixed relation with the axis of each of said sprockets to assure maintained meshing engagement of said driving chain course with each of said sprockets.

3. A conveyor as defined in claim 2 wherein said securing means includes a bracket associated with each of said sprockets, and means securing said bracket to said frame in fixed relation with the axis of the associated said sprocket.

4. A conveyor as defined in claim 2 wherein each of said sprockets is rotatably supported on a bolt mounted in fixed position on said frame, said securing means includes a bracket associated with each of said sprockets, said bracket has a hole therethrough receiving said mounting bolt for the associated said sprocket, and additional means secure each said bracket to said frame separately from the associated said bolt.

5. A conveyor as defined in claim 1 wherein said first flange also includes a downwardly facing elongated shoulder proportioned to cooperate with said shoulder on said second flange to retain said return chain course against lateral displacement from said upwardly facing shoulder on said second flange.

6. A conveyor as defined in claim 1 wherein said frame includes inner and outer rails curved in a generally horizontal plane, said chain is located adjacent said inner rail, and said guide member is mounted on the inner surface of said inner rail.

7. A conveyor as defined in claim 6 wherein said chain is of the roller and links type including a pin connecting each roller with four links, and wherein said guide member includes rib portions for engagement with said rollers between said links and also includes grooves for receiving the ends of said pins.

8. A conveyor as defined in claim 1 wherein said guide member includes surface portions extending above said first flange and between said flanges which are alligned laterally with said chain courses respectively and form guiding surfaces positively limiting movement of said chain courses toward said inner rail.

9. A conveyor as defined in claim 1 further comprising axle means supporting each of said power drive wheels and the associated said sprocket in coaxial relation, and means forming a cantilever mounting for each said axle means on said frame in overlying relation with said driving chain course.

10. A conveyor as defined in claim 9 further comprising means securing said chain guide member to said frame below and in fixed relation with each of said axle means and with said shoulder on said first flange spaced laterally from said frame in underlying relation with said axle means in a vertical plane spaced from said cantilever mounting of said axle means, whereby said driving chain course forms bracing means between said flange and said sprocket.

11. A conveyor which comprises a frame including a side rail, a plurality of live rollers rotatably mounted on said frame, a plurality of friction rolls, means for rotatably mounting each of said friction rolls on said frame underlying said live rollers with each of said live rollers being driven by one of said friction rolls, a sprocket carried by each said friction roll, a drive chain including a chain course running below said sprockets for driving said sprockets, an elongated chain guide member substantially coextensive with said driving chain course and mounted on said frame, said chain guide member including an upwardly extending elongated supporting shoulder under and laterally guiding said sprocket-driving chain course into mesh with said sprockets, means for driving said chain to drive said friction rolls and said live rollers, said means for rotatably mounting each of said friction rolls including a bolt member mounted on said side rail and extending horizontally therefrom, and said conveyor including a finger guard mounted on each said bolt member remote from said side rail and extending substantially to said side rail in overlying relation to said friction roll associated with said bolt member and in closely spaced relation with one of said live rollers driven by the associated said friction roll to prevent entry of a finger between said live roller and associated said friction roll.

12. A conveyor as in claim 11 in which said upper flange of said shingle guard member includes tab members extending upwardly therefrom in closely spaced relation to said live rollers associated with said friction rolls supported by said bolt members associated with said shingle guard member to prevent entry of a finger under said live rollers.

13. A conveyor which comprises a frame including a side rail, a plurality of live rollers rotatably mounted on said frame, a plurality of friction rolls, means for rotatably mounting each of said friction rolls on said frame underlying said live rollers with each of said live rollers being driven by one of said friction rolls, a sprocket carried by each said friction roll, a drive chain including a chain course running below said sprockets for driving said sprockets, an elongated chain guide member mounted on said frame and substantially coextensive with said driving chain course, said chain guide member including an upwardly extending elongated supporting shoulder under and laterally guiding said sprocket driving chain course in mesh with said sprockets, means for driving said chain to drive said friction rolls and live rollers, said means for rotatably mounting each of said friction rolls including a bolt member mounted on said side rail and extending horizontally therefrom, a pair of said live rollers being driven by each said friction roll, and said conveyor including a finger guard mounted on each said bolt member remote from said side rail and extending substantially to said side rail in overlying relation to said friction roll associated with said bolt member and in closely spaced relation with said live rollers driven by said associated friction roll to prevent entry of a finger between said associated friction roll and live rollers.

14. A conveyor which comprises a frame including a side rail, a plurality of live rollers rotatably mounted on said frame, a plurality of friction rolls, means for rotatably mounting each of said friction rolls on said frame underlying said live rollers with each of said live rollers being driven by one of said friction rolls, said means for rotatably mounting each of said friction rolls including a bolt member mounted on said side rail and extending horizontally therefrom, a sprocket carried by each said friction roll, a drive chain including a chain course running below said sprockets for driving said sprockets, an elongated chain guide member substantially coextensive with said driving chain course and mounted on said frame, said chain guide member including an upwardly extending elongated wupporting shoulder under and laterally guiding said sprocket-driving chain course into mesh with said sprockets, means for driving said chain to drive said friction rolls and said live rollers, and a plurality of shingle guard members mounted on said bolt members, each of said shingle guard members including a body spanning adjacent bolt members spaced from said side rail and an upper flange extending from said body to adjacent said side rail underlying said live rollers.

* * * * *